(12) United States Patent
Day

(10) Patent No.: US 7,756,913 B1
(45) Date of Patent: Jul. 13, 2010

(54) SYSTEM AND METHODS FOR SELECTING CONTENT DISTRIBUTION

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 571 days.

(21) Appl. No.: 10/909,663

(22) Filed: Aug. 2, 2004

(51) Int. Cl.
*G06F 17/20* (2006.01)
*G06F 15/16* (2006.01)

(52) U.S. Cl. .................... 707/821; 707/822; 709/225

(58) Field of Classification Search ............. 707/6; 709/225
See application file for complete search history.

(56) References Cited

U.S. PATENT DOCUMENTS

| | | | |
|---|---|---|---|
| 5,826,265 A | 10/1998 | Van Huben et al. | 707/8 |
| 6,363,411 B1 | 3/2002 | Dugan et al. | 709/202 |
| 6,507,727 B1 | 1/2003 | Henrick | 455/3.06 |
| 6,516,340 B2 | 2/2003 | Boys | 709/204 |
| 6,535,592 B1 | 3/2003 | Snelgrove | 379/114.07 |
| 6,701,366 B1 | 3/2004 | Kallas et al. | 709/227 |
| 6,753,863 B1 | 6/2004 | Winkler et al. | 345/473 |
| 6,757,740 B1 | 6/2004 | Parekh et al. | 709/245 |
| 2002/0049841 A1* | 4/2002 | Johnson et al. | 709/225 |
| 2002/0138619 A1* | 9/2002 | Ramaley et al. | 709/226 |
| 2003/0037026 A1* | 2/2003 | Bantz et al. | 707/1 |

OTHER PUBLICATIONS

Filezilla Newsletter, May 14, 2006; pp. 1-3.*
Filezilla 2.2.2 Screen Shots, Dec. 7, 2003; pp. 1-2.*
FileZilla 2.2.2 Screen Shot, Dec. 7, 2003, p. 3.*
RFC 959 entitled "File Transfer Protocal (FTP)" by Postel, et al. dated Oct. 1985 printed from http://tools.ietf.org/html/rfc959 on Jun. 4, 2009, pp. 1-70.

* cited by examiner

*Primary Examiner*—Jean B. Fleurantin
*Assistant Examiner*—Alex Gofman
(74) *Attorney, Agent, or Firm*—Hickman Palermo Truong & Becker LLP

(57) ABSTRACT

A GUI and CDN server device provide user modifiable selections of preferences for delivery treatment, and map the user selections to technical operational parameters in the CDN servers for effecting the requested delivery treatment. Users typically find it beneficial to interact with a file (content) entity in terms of the user visible delivery treatment. The server device provides the ability to define the delivery treatment according to the manner in which the user finds most beneficial. However, the CDN operational parameters for effecting such delivery are not readily available or understood by a typical user. Using the GUI, the CDN server identifies a content entity, and receives at least one user selection variable indicative of delivery treatment of the identified content entity. A correlator maps the received user selections to operational parameters according a set of rules, and a delivery engine effects delivery of the content entity according to the mapped operational parameters to provide delivery results according to the preferred delivery treatment.

18 Claims, 7 Drawing Sheets

SYSTEM AND METHODS FOR SELECTING CONTENT DISTRIBUTION

BACKGROUND

Content Delivery Networks (CDNs) facilitate distribution of various forms of digital media to a user community. The user community may be geographically dispersed, and the forms of digital media, or content, served by a CDN include many files and file-related forms such as textual documents, program code, executable entities, audio, video and other multimedia streaming media, to name several. Further, the CDN may serve a narrow domain, such as a corporate educational network directed to a corporation's educational, diagnostic and/or technical volumes and documentation, or may serve a broader base such as a multimedia provider providing services such as broadband Internet, cable TV and video on demand to a general population of household subscribers.

The CDN includes a set of interconnected nodes accessible to the user community. The users of the CDN may obtain access to the content in the CDN more readily than through non-CDN assisted means, typically general Internet search engines and disparate menu driven interfaces. Typically the CDN is operable to serve such content from alternative locations which is "nearer," in terms of network distance, to the content consumer than the single origin server. Further, the CDN content may include security features and fee structures which complicate or prohibit other forms of access.

The CDN, therefore, includes a plurality of nodes which collectively have access to the entire content body of the CDN. Different CDN nodes have various functions, and software driving the CDN designates and employs the various nodes accordingly. Therefore, a typical CDN is composed of (i) a collection of edge servers, (ii) a distribution system for moving content out to the edge servers, (iii) a request-routing system for intercepting content requests from content consumers and directing those requests to appropriate edge servers, and (iv) a management system tying these elements together for monitoring and control. Internet (IETF) RFC 3466, codifies a similar taxonomy of a general framework. Typical exemplary node types may include edge servers, or routers, connect to users directly, and initially receive the user request for such content. Origin servers represent the originating point for content, which may be external to the CDN. Root servers exist within the CDN to gather and maintain a set of content in geographic proximity to the expected user demand. A manifest enumerates the set of content, or files, available to each root server, and the root server employs other CDN servers to manipulate and transport requested content accordingly.

Generally, therefore, each user connects to one of the nodes which is directly or indirectly connected to a node containing the content sought by the user. However, depending on the arrangement of the CDN, obtaining the content requested by the user involves finding the content and transporting the content to the user. A CDN, therefore, tends to form a complex array of geographically dispersed nodes, or servers, which cooperatively strive to efficiently store and transport requested content to the user.

SUMMARY

In a typical CDN, users request available content as file entities, typically via a request URL indicative of the identity and logical or apparent location of the desired content. Often, it is desirable to treat different request URLs differently depending on the requestor, the source of the content, the usage of the content, and other factors. For example, a large content entity which is relatively static and unchanging may be better received by allowing local servers which mirror or cache the content to satisfy the request. Conversely, a dynamic content entity, such as one including stock quotes or other timely information, may be relatively small and highly subject to staleness. Such a file would be better received from the freshest source available, even if additional transmission resources are involved.

Conventional CDNs involve the input of a system administrator to designate delivery facilities and results for particular URLs indicative of the manner in which the content entity corresponding to the URL is to be delivered. Typically, the delivery facilities and results specify operational parameters, which may be of a highly complex and technical nature, instructing the CDN servers of commands and modes for retrieving, transmitting, and caching the content entity for delivery to a requesting user. Such parameters may specify items such as transport protocol, packet size, retransmission time, blocking and semaphore values, caching lifetime values, and other variables which affect the processing of the content entity over the CDN for delivery to a user.

Configurations of the invention are based, in part, on the observation that the user perceived treatment and delivery of a file by the CDN may not be readily selectable, such as by a graphical user interface offering such selections. Conventional CDN treatment is governed by operational parameters which are typically maintained and modified by a system administrator having knowledge of how such parameters relate to and translate into user visible delivery. Setting and modifying such operational parameters accordingly to effect a particular delivery style is not readily apparent and requires input by one knowledgeable of such operational parameters and how they relate to the delivery presentation to a user.

Often, a content owner may find it beneficial to interact with a file (content) entity in terms of the user visible delivery treatment. In other words, it would be desirable to have the ability to define the delivery treatment according to the manner in which the user finds most beneficial. However, as indicated above, the operational parameters for effecting such delivery are not readily available or understood by a typical user. For example, a user may want to specify file freshness over caching or fast delivery over conservation of bandwidth, but the operational parameters regulating such operation are obscured in an inaccessible or incomprehensible administrator interface. Accordingly, configurations of the invention substantially overcome the above-described shortcomings with CDN delivery treatment by providing user modifiable selections of preferences for delivery treatment, and mapping the user selections to operational parameters in the CDN servers for effecting the requested delivery treatment.

It should be noted that the notion of "user visible" treatment is intended to convey a results oriented, tangible mechanism for specifying how particular content is received and manipulated. The principles of the invention therefore relieve the user from identifying technical specifics about how the desired results are achieved. To this end, the "user" of the CDN may encompass several roles. In general, there are three types of users in the context of the present invention: the "content provider", the "network admin" and the "content consumer." The "content provider" knows a lot about the characteristics of the content but not much about the network technology. The "network admin" knows a lot about the network but not much about the content. The "content consumer" gets the content and benefits from the work of the others in arranging the CDN but is typically unaware that any special effort was required—in many cases it is desirable for the CDN to be invisible. Configurations of the invention, in particular, enable the content provider to tune aspects of content delivery without having to actually understand the detailed technology that is exposed to and controlled by the network admin. Alternate configurations and operation may encompass configurations in which these three roles are combined into fewer than three people/machines, however it should be noted that typically there are usually three distinct kinds of users in the context of the CDN.

In further detail, the method of distributing content according to the claimed invention includes identifying a content entity operable for selective distribution patterns, and receiving at least one user selection variable indicative of a preferred treatment for delivery of the identified content entity. A correlator maps the received user selections to operational parameters according to a set of rules, and a delivery engine effects delivery of the content entity according to the mapped operational parameters to provide delivery results according to the preferred delivery treatment.

In particular configurations, receiving the user selections further includes reading user input from GUI selections indicative of delivery treatment in a CDN, in which the delivery treatment is denoted by selection buttons operable via the GUI. Each of the selection buttons corresponds to a range of choices of the manner in which the file entities are processed in the CDN. The selection buttons convey a user visible understandable result effected by the selection, therefore identifying a plurality of user selectable preferred delivery treatments. Therefore, the GUI selections portray a use model that is separate from (abstracted away from) the concrete implementation effected by the underlying CDN. Such a use model is closer to the terms in which the content owner thinks about content and its movement, and further avoids burdening the GUI with detailed aspects of content movement that don't need to be visible in most cases. The CDN server then determines the corresponding operational parameters adapted to effect delivery of the identified content entries, as discussed further below.

The CDN server identifies delivery attributes in the received selection variables, and processes the identified delivery attributes according to the set of delivery rules, in which the delivery rules are indicative of operational parameters for providing the preferred delivery treatment. The CDN server computes the operational parameters corresponding to the identified delivery attributes for providing the delivery treatment by matching the received selections to the attributes corresponding to each of the available delivery treatments and applying the operational parameters to perform delivery according to the matched delivery treatment. Such mapping relieves the user or operator from knowing or specifying the network operational parameters for effecting the desired delivery result.

In particular configurations, the CDN server identifies, downloads, or otherwise determines the set of rules which map a plurality of user selection variables to the corresponding operational parameters, in which each of the rules associates delivery attributes determined by the user selection variables to a preferred delivery treatment. The CDN server then disseminates the computed operational parameters to devices adapted to provide the specified file entities, which may include a plurality of CDN servers relevant to providing the requested content entity.

In the exemplary configuration, the content entities are stored digital data items in a content distribution network operable to be transported from origin servers to edge nodes operable for serving users via an interconnection of server nodes in the content distribution network, in which the stored digital data items further comprise at least one of individual files, groupings of files, and streaming media. Other types of stored entities may be envisioned. The CDN may employ multiple server types for providing efficient organization and indexing of content therein for efficient delivery to requesting users. Such exemplary sever types include content engines, origin servers, edge routers, root servers, and others.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

CDNs often involve the input of a system administrator to designate delivery treatment for particular URLs indicative of the manner in which the content entity corresponding to the URL is to be delivered. Typically, the delivery treatment specifies operational parameters, which may be of a highly complex and technical nature, instructing the CDN servers of commands and modes for retrieving, transmitting, and caching the content entity for delivery to a requesting user. Such parameters may specify items such as transport protocol, packet size, retransmission time, blocking and semaphore values, caching lifetime values, and other variables which affect the processing of the content entity over the CDN for delivery to a user.

Configurations of the invention are based, in part, on the observation that the user perceived treatment and delivery of a file by the CDN may not be readily selectable, such as by a graphical user interface offering such selections. Often, a user may find it beneficial to interact with a requested content entity in terms of the user visible delivery treatment. In other words, to have the ability to define the delivery treatment according to the manner in which the user finds most beneficial would provide user control and selection of the appropriate operating parameters. However, as indicated above, the operational parameters for effecting such delivery are not readily available or understood by a typical user. Accordingly, configurations of the invention substantially overcome the above-described shortcomings with CDN delivery treatment by providing user modifiable selections of preferences for delivery treatment, and mapping the user selections to operational parameters in the CDN servers for effecting the requested delivery treatment.

Figure 1:
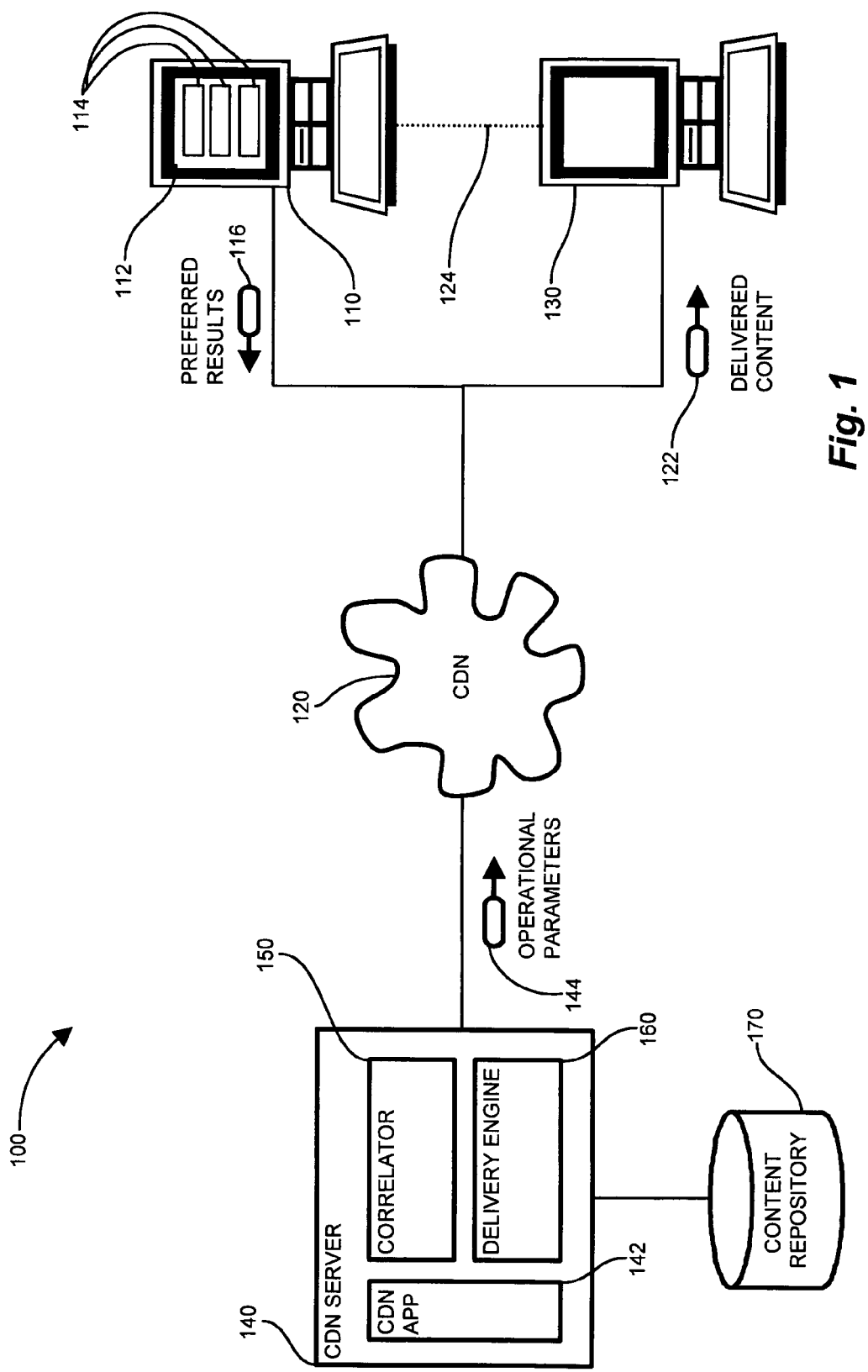
FIG. 1 is a context diagram of a network communications environment operable for use with the present invention.

FIG. 1 is a context diagram of a network communications environment 100 operable for use with the present invention. Referring to FIG. 1, the environment 100 includes a user or operator selection station 110 connected to a content delivery network (CDN) 120. A user or operator may select delivery results 114 as icons or screen objects from the selection screen 112. A content receiver station 130 is also connected to the CDN 120 for receiving the delivered content 122 from the CDN 120, which may be the same machine as the selection station 110, as shown by dotted line 124. Alternatively, a distinct operator may select delivery results 114 from the selection screen 112. The user selections 114 define the preferred results message 116 indicative of delivery treatment for the delivered content 122 to an end user at the content receiver station 130.

The CDN 120 is coupled to a plurality of content delivery servers 140 (CDN servers), described in further detail below, for storing and providing the various CDN content to user stations 130 as delivered content 122. It should be emphasized that a typical CDN 120 is actually an overlay network—certain servers and clients of a network, intranet or the Internet have predetermined roles in the CDN and when observed from a CDN perspective, as in FIGS. 1 and 3, one observes such elements as constituting a special network in their own right. However, the underlying network technologies (e.g. HTTP/TCP/IP) may operate in a typical manner such as in the Internet. As indicated above, the CDN 120 interconnects many CDN servers 140, depending on the scope and demand of the CDN 120, and is shown here with a single exemplary server 140 for illustrative purposes. The exemplary CDN server 140 configured consistent with the principles of the invention includes a correlator 150 and a delivery engine 160, both responsive to a CDN application 142. The correlator 150 receives the user specified preferred results message 116, and the delivery engine 160 computes and transmits the operational parameters 162 to the other CDN servers 140-N to apply to the delivered content 122.

In the exemplary configuration 100 shown, therefore, the CDN server 140 illustratively represents a plurality of interconnected processing devices, or components 140-N in the CDN 120. In a particular arrangement, the mechanisms for controlling movement of content 122 would typically involve two or more CDN components 140-N such as the CDN server 140 of FIG. 1), one component 140-N near the origin and one component 140-N near the relevant content consumer, discussed further below with respect to FIG. 3. In the exemplary CDN application 142 embodiment, such components are Content Engines or CEs. The context for the invention is that there would already be a system or application 142 that involves the movement of content 122 under administrative control from one component, or server 140-N to another using multiple distribution mechanisms. Effectively, therefore, configurations provide a new layer or front-end on the administrative controls of that pre-existing system with multiple means of moving content from, say, component A 140-N to component B 140-N.

Figure 2:
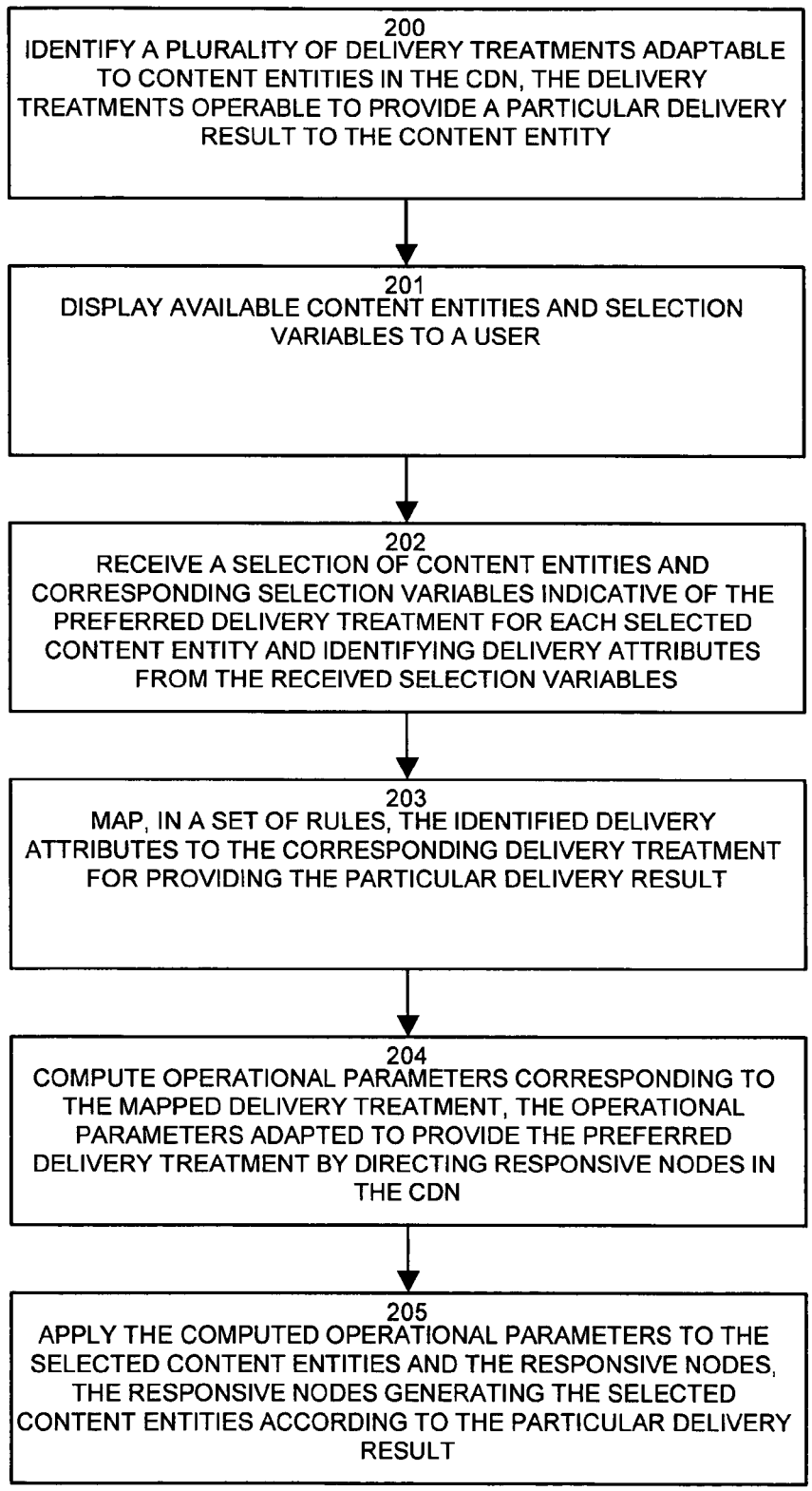
FIG. 2 is a flowchart of employing the content delivery server device for selecting content distribution results in the network of FIG. 1.

FIG. 2 is a flowchart of employing the content delivery server device for selecting content distribution results in the network of FIG. 1. Referring to FIGS. 1 and 2, the method of providing content in a content delivery network (CDN) 120 includes identifying a plurality of delivery treatments adaptable to content entities 122 in the CDN, in which the delivery treatments are operable to provide a particular delivery result 116 to the content entity 122, as depicted at step 200. A CDN application 142 is operable to present a graphical user interface (GUI) screen 112 for enumerating user visible selection variables 114 corresponding to each of the delivery treatments. Alternatively, other management applications may be operable to provide the GUI 112 and perform responsively to the CDN 120 according to the principles disclosed herein. The user visible criteria includes variables in terms of user perception, rather than the operational parameters of the CDN 120 which cause and/or control the delivery result. In this manner, the user/operator views a result oriented set of variables rather than a detailed technical selection menu of CDN settings. The application 142 employs the user interface screen 112 for displaying available selection variables 114 to a user, as shown at step 201.

Following GUI selection, the application 142 receives a selection of content entities and corresponding selection variables 114 indicative of the preferred delivery results 116, or treatment, for each selected content entity. The correlator 150, responsive to the CDN application 142, identifies delivery attributes from the received selection variables 114, as depicted at step 202. The correlator maps, in a set of delivery rules (152, FIG. 3 below), the identified delivery attributes to the corresponding delivery treatment for providing the particular delivery result 116 specified by the user, as shown at step 203.

The delivery engine 160 computes the operational parameters 144 corresponding to the mapped delivery treatment, in which the operational parameters 144 are adapted to provide the preferred delivery results 116 by directing responsive nodes 130 in the CDN 120, as shown at step 204. Multiple CDN nodes 130, discussed further below, may be involved in delivering the content 122 according to the operational parameters 144. The relevant CDN nodes 130 apply the computed operational parameters 144 to the selected content entities (i.e. delivered content 122) and the responsive nodes 130, the responsive nodes generating the selected content entities 122 according to the particular delivery result 116 specified by the user on the GUI screen 112, as depicted at step 205. It should be noted that the selection variables 114 may be entered on the same user device 112 as the delivered content 122, as shown by dotted line 124, thus allowing a user to manipulate their own delivery results. Alternatively, the preferred results 116 may be specified by an operator for receipt by users at the user device 130.

Figure 3:
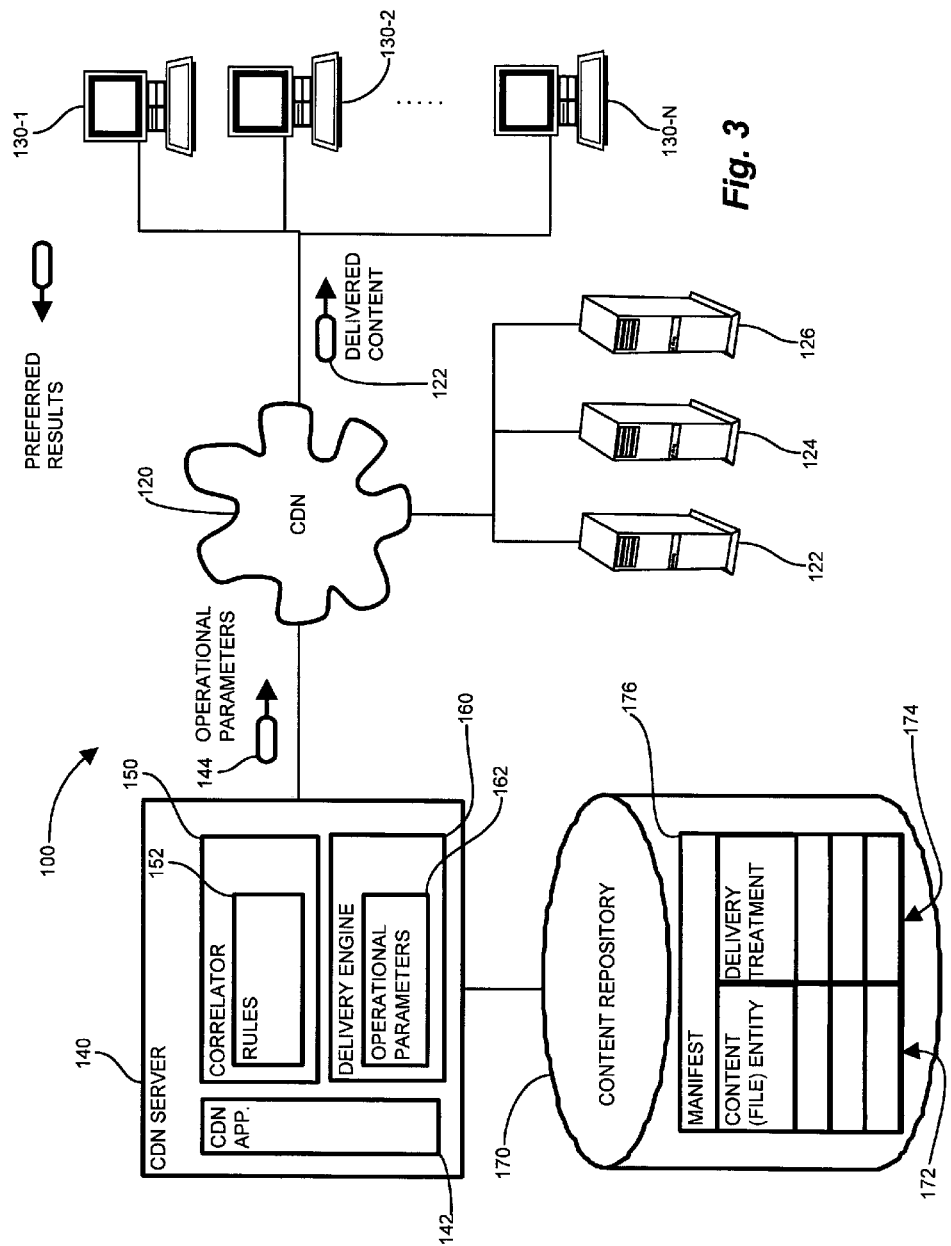
FIG. 3 is a block diagram of the content delivery server device of FIG. 1 in greater detail.

FIG. 3 is a block diagram of the content delivery server device of FIG. 1 in greater detail. Referring to FIGS. 1 and 3, the CDN 120 interconnects and serves a plurality of end user devices 130-1 . . . 130-N (130 generally). The CDN 120 includes a plurality of server types, such as root servers 122, origin servers 124, content engines 126 and others, collectively referred to generally as CDN servers 140, employed for identifying, obtaining, storing, retrieving, and delivering various types of CDN content. Typically a software entity runs cooperatively on each such CDN server 120, such as components of the CDN application 142. In the exemplary arrangement, such a software product is the Cisco Application and Content Networking System (ACNS), marketed commercially by Cisco Systems, Inc., of San Jose, Calif. 95134.

Figure 4:
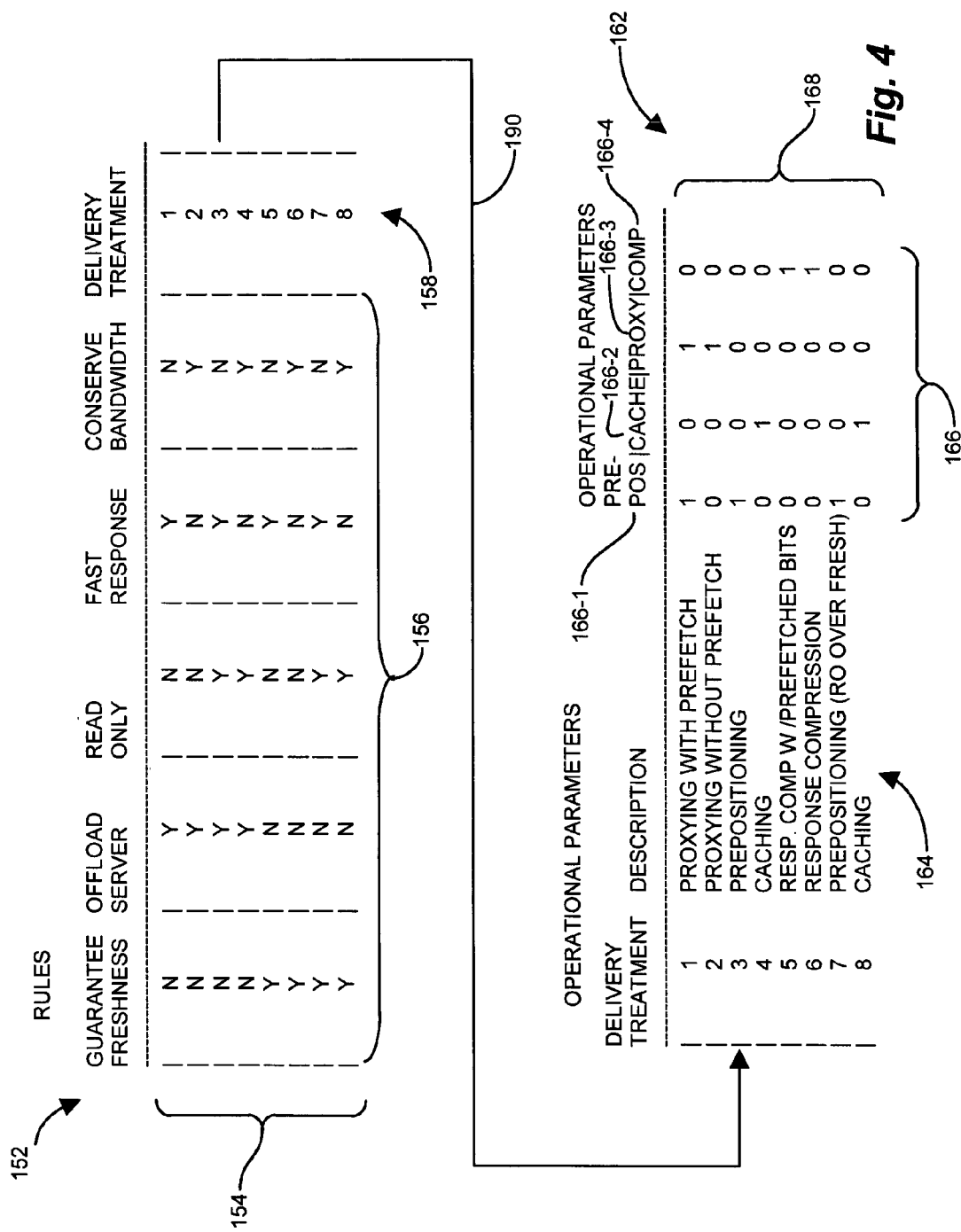
FIG. 4 shows exemplary correlation tables for indexing the user selected preferred delivery results to operational parameters.

FIG. 4 shows the correlation tables for indexing the user selected preferred delivery results to operational parameters. Referring to FIGS. 3 and 4, an exemplary rule set is shown in table 152 for matching the received user selections 114 to the delivery treatment. An operational parameters table 162 in the delivery engine 160 computes the operational parameters 164 from among available delivery facilities in the CDN server 140. The illustrated tables are exemplary. Alternate rule representations and mapping mechanisms may be employed, such as reducing the available delivery treatments to correspond to multiple rule "hits." Other efficiency and optimization alternatives may be apparent to those of skill in the art.

Continuing to refer to FIGS. 3 and 4, as indicated above, the CDN server 140 configured according to the principles of the invention includes the correlator 150 and delivery engine 160. The correlator 150 includes rules 152, further having a set of rule entries 154, each entry 154 further including delivery treatment attributes 156-1.156-5 and a corresponding delivery treatment field 158. The delivery engine 160 includes a set of entries 162, each having a complementary delivery treatment selection field 164 and corresponding operational parameters 166 for effecting delivery consistent with the delivery treatment 164. Further, a content repository 170 including the CDN content for delivery attaches delivery treatment 174 attributes to individual CDN content (file) entities 172 in a list of available CDN content known as a manifest 176.

The rules 152 include a set of rule entries 154, each specifying delivery attributes 156 corresponding to the user selections 114. The correlator 150 matches received user selections 114 to find a corresponding entry 154 indicative of a delivery treatment. The exemplary attributes are as follows: "Offload Server" and "Guarantee Freshness," which may be implemented as a radio button to designate the user selection 114; "Read-only, implemented as a user selection 114 check box; and "Fast Response" vs. "Conserve Bandwidth," which may be implemented as a radio button user selection 114. Accordingly, the user perception of these attributes provides that the offload server attribute allows a local copy of content to be employed, rather than tracking the content back to the source. Guarantee freshness, conversely, is an attribute which requests the original source, in order to obtain the most recent updates. The read-only attribute avoids locking and designating an updated version. Fast response affects transmission parameters such as QOS (Quality of Service), rate, and compression, and the attribute requests a higher priority for the corresponding content. The conserve bandwidth attribute, on the other hand, optimizes resources to avoid blocking or slowing other concurrent transmissions.

The determined delivery treatment maps to the operational parameters table 162 in the delivery engine 160. The operational parameters 162 table includes a set of operational parameter entries 168 indicative of each of the available delivery treatments 164. Each of the delivery treatments 164 employs one or more of available delivery facilities 166 supportable by the CDN server 140. The delivery engine identifies the delivery facilities 166 to employ from the entry 168 corresponding to the mapped delivery treatment 164, shown by arrow 190. In the example shown, the available delivery facilities include file prepositioning 166-1, which moves an entire file to the edge (e.g. an edge server) of the CDN in advance of demand; file caching 166-2, which fetches the file upon demand from a CDN user; file proxying 166-3, which fetches/writes files stored on a remote server through a local proxy; and response compression 166-4, which sends request to a remote server 130 but applies compression to reduce the number of bits sent. The delivery engine 160 computes operational parameters 144 for the delivery facilities to be employed for providing the mapped delivery treatment 164.

The correlator 150 employs the rules for determining the delivery treatment 158 from the user specified preferred results 116, specified in terms of user visible (i.e. tangible to the user perspective) settings 114 from the GUI. The delivery engine 160 computes, or translates, the user cognizable terms defining the delivery treatment, into the operational parameters 166 for effecting such a result or performance. The attributes for "offload server" and "guarantee freshness" are shown as mutually exclusive, as are "fast response" and "conserve bandwidth," however alternate configurations may employ other attribute arrangements. Further, the operational parameters 166 for the available delivery facilities may incorporate a multitude of alternate network parameters and technical settings and/or variables. The delivery engine 160 is operable to apply the corresponding operational parameters 166 based on a determined delivery treatment 158 from the rules 152.

Figure 5:
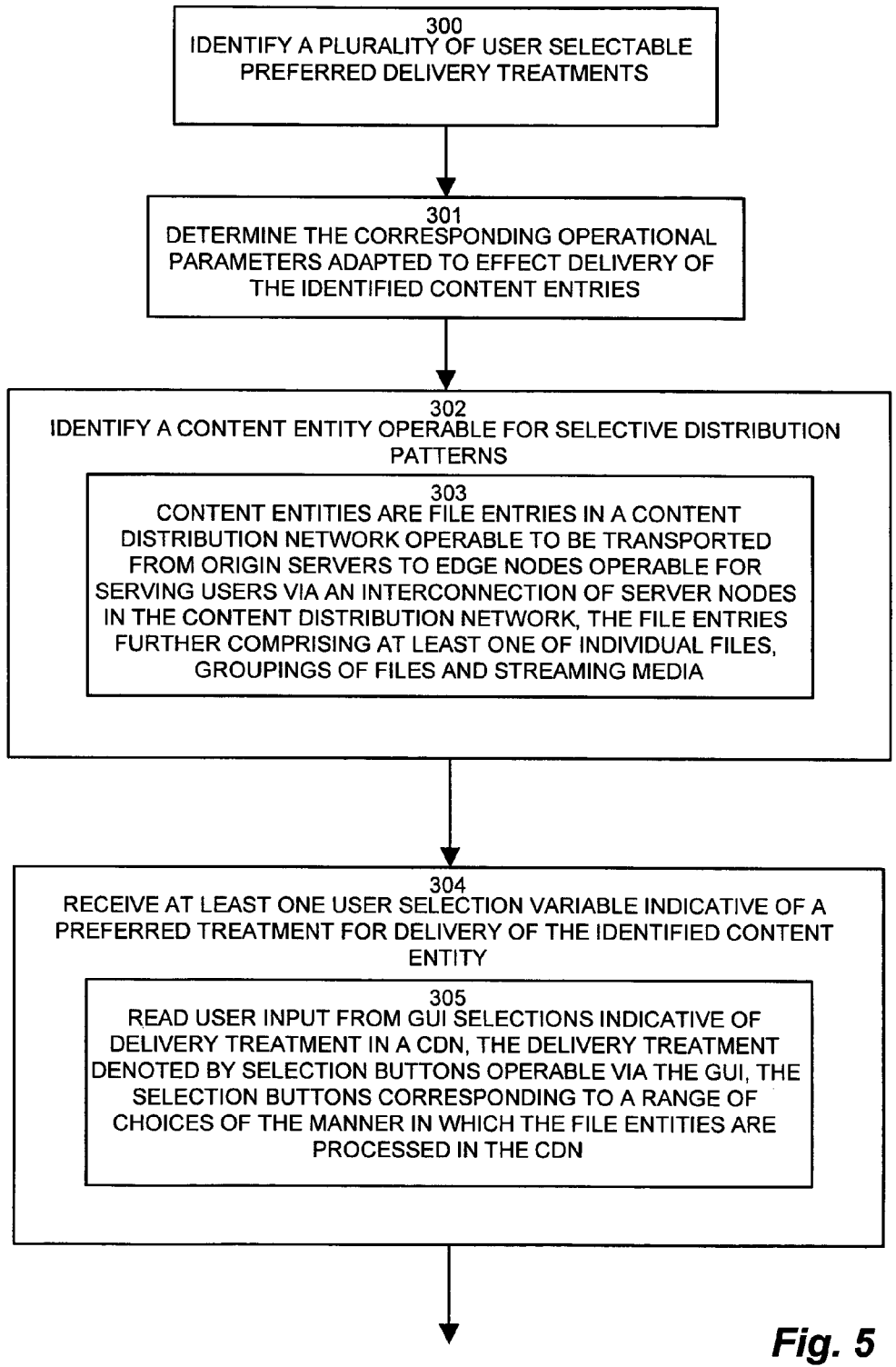
FIGS. 5-7 are a flowchart of the operation of the content delivery server device of FIG. 3.
Figure 6:
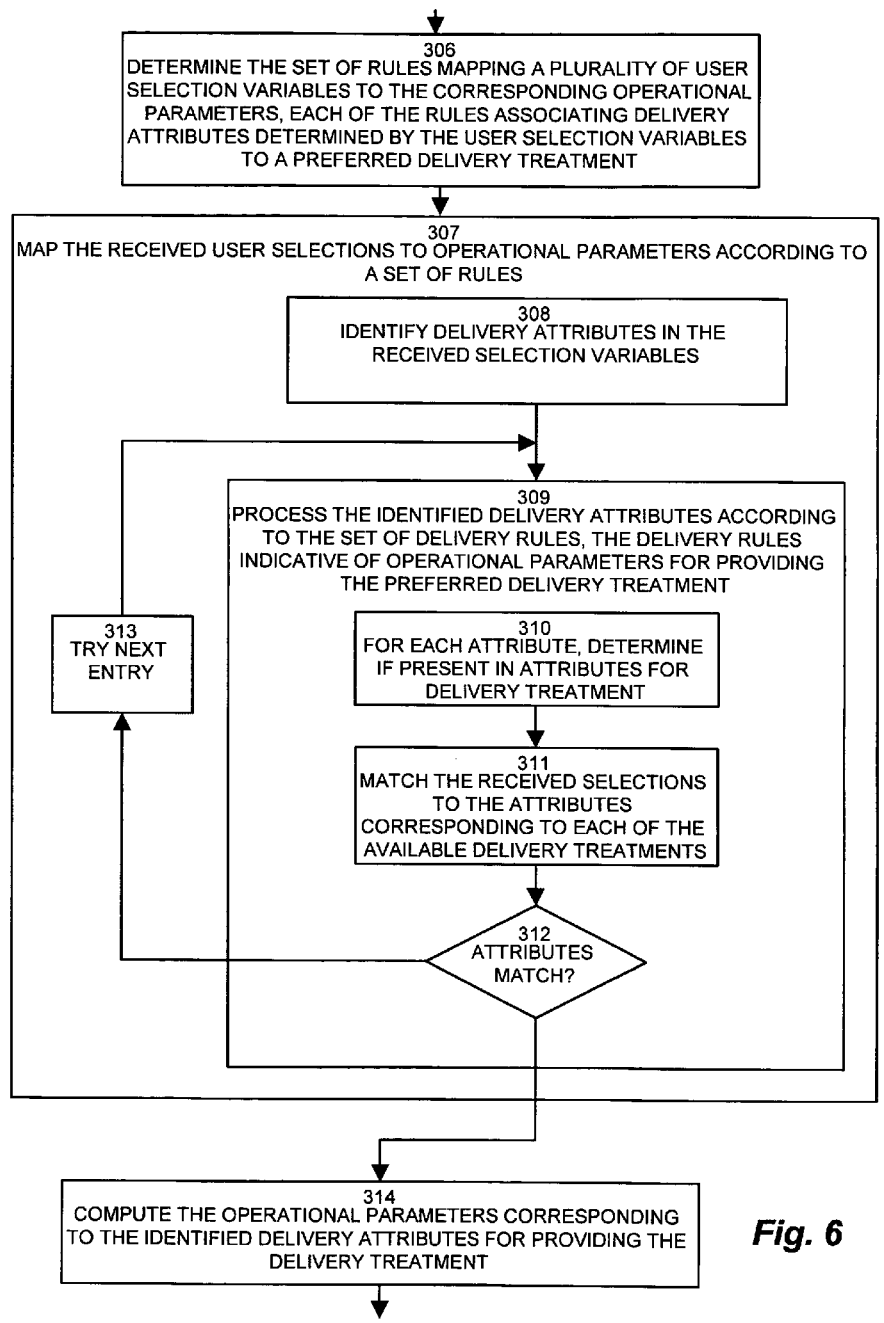
Figure 7:
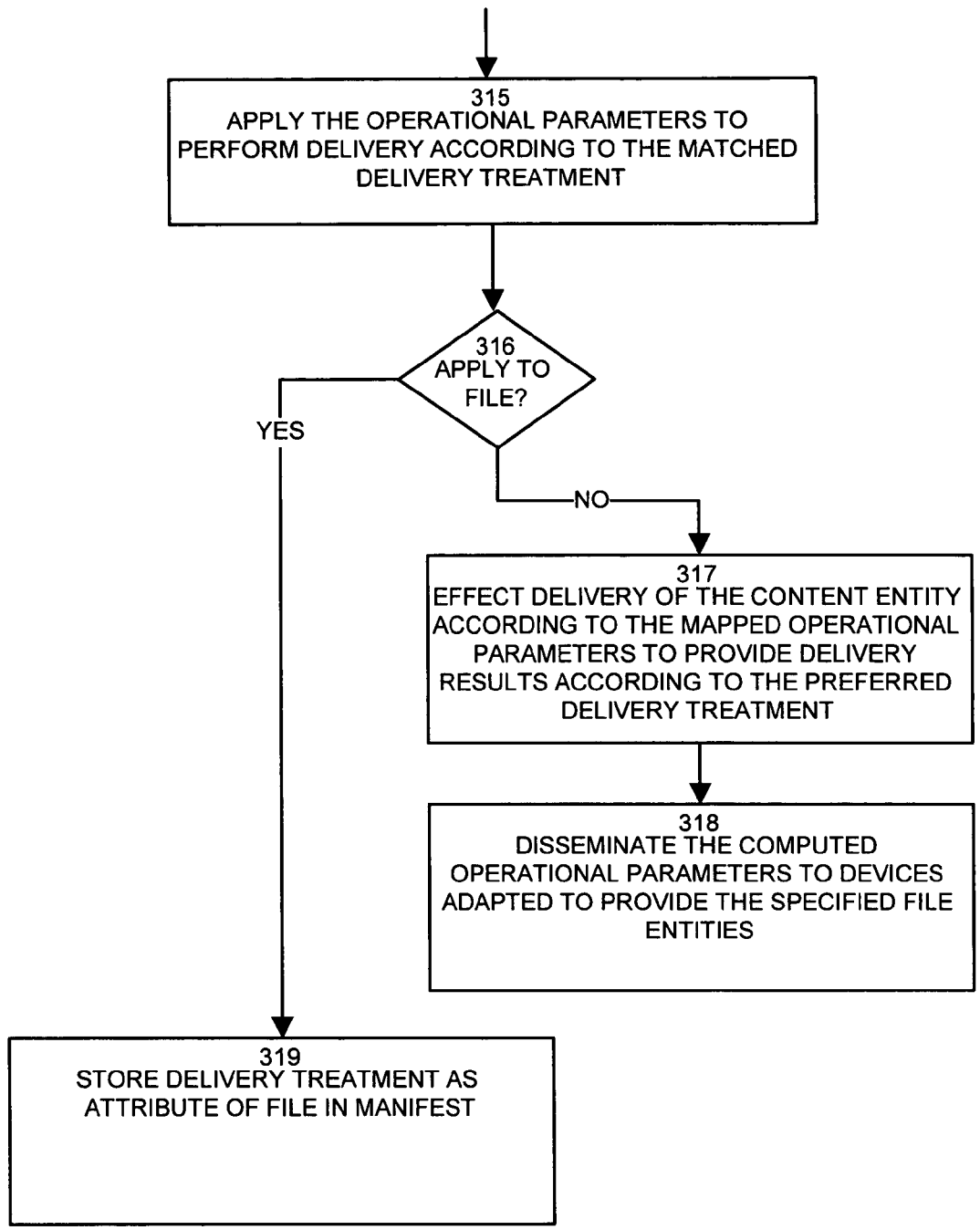

FIGS. 5-7 are a flowchart of the operation of the CDN server 140 device of FIG. 3. Referring to FIGS. 3-7, the CDN server 140 receives or identifies a plurality of user selectable preferred delivery treatments 158, as depicted at step 300, and determines the corresponding operational parameters 166 adapted to effect delivery of the identified content entries 122, as shown at step 301, thus populating the rules 152 table and the operational parameters 162 table. As indicated above, the delivery treatments 158 translate into operational parameters 166 based on available delivery facilities 166-1 . . . 166-4 in the CDN 120.

A content provider identifies or selects a content entity 172 operable for selective distribution patterns as delivered content 122 as described herein, as depicted at step 302. The content entities 172 are stored digital data items, such as file entries, in a content distribution network 120 operable to be transported from origin servers to edge nodes operable for serving users via an interconnection of server nodes in the content distribution network, in which the stored digital data items further include at least one of individual files, groupings of files and streaming media, as depicted at step 303, and may include other forms of digital media operable to be stored and distributed by the CDN 120.

An end-user device 130 such as a PC or workstation is operable to receive selection variables indicative of preferred treatment, or results 116 for delivery of the identified content entity 172, as disclosed at step 304. Receiving the selections further includes reading user input from GUI selections 114 on a selection screen 112 indicative of delivery treatment in a CDN, the delivery treatment denoted by selection buttons 114 operable via the GUI, as shown at step 305. The selection buttons 114 or other icons correspond to a range of user-visible choices of the manner in which the file entities are processed in the CDN, such as the exemplary attributes 156 described above. Alternate configurations may employ other attributes depending on the needs and capability of the CDN 120 and associated environment 100.

After receiving the user selections 114 in the form of a preferred results message 116 or other suitable format, the correlator 150 identifies or determines the set of rules 152 for mapping the user selection variables 114 to the corresponding operational parameters 166, in which each of the rules 154 associates delivery attributes 156 determined by the user selection variables 114 to a preferred delivery treatment 158, as depicted at step 306.

The CDN server 140 then maps the received user selections to operational parameters according to the set of rules 152 and parameter table 162, as shown at step 307. The correlator 150 identifies delivery attributes in the received selection variables, as depicted at step 308, by extracting the user selections 114 of the GUI screen 112 from the preferred result message 116. The correlator 116 processes the identified delivery attributes according to the set of delivery rules 152, the delivery rules being indicative of the operational parameters 166 for providing the preferred delivery treatment 158, as shown at step 309. For each attribute received from the user selections 114, the correlator 150 determines if the received attribute is present in the attributes 156 of a rule entry 154 for delivery treatment 158, as shown at step 310. The correlator 150 therefore matches the received selections 114 to the attributes 156 corresponding to each of the available delivery treatments 158 in each rule entry 154, as shown at step 311. A check is performed, at step 312, to determine if the attributes 156 match. If not, then the correlator 150 attempts to match the next entry 154, as depicted at step 313. In this manner, the user selections 114 defined by delivery attributes are matched against each of the available sets of attributes 156 to find the delivery treatment 158 which will satisfy the user's preferred result 116.

If a match is found, then the delivery engine 160 computes the operational parameters 166 corresponding to the identified delivery attributes 156 for providing the delivery treatment 158 indicated by the matching entry 154, as shown at step 314. In alternate configurations, the exemplary attribute 156 matching depicted in the rules 152 table may be a correlation according to a heuristic, depending on the number of attributes for matching and the available delivery treatments, resulting in a "best fit" conclusion.

The delivery engine 160 apples the computed operational parameters 166 to perform delivery according to the matched delivery treatment 164, as shown at step 315. The exemplary operational parameters 162 table illustrates each of the available facilities 166-1.166-4 as operational parameters selectable by a "1" in the table 162. A check is performed, at step 316, to determine if the delivery treatment 156 is to be applied to the file (e.g. content entity) 172 or employed to provide the selected content 122 to a user. As indicated above, the delivery treatment 158 may either be selectable upon delivery of the content responsive to a request, or may be attached to the content entity itself. If the delivery treatment 158 is applicable to a current content request, the CDN server 140 effects delivery of the content entity 122 according to the mapped operational parameters 166 to provide delivery results according to the preferred delivery treatment 164, as shown at step 317. In the CDN 120, other CDN servers 122, 124, 126 may be employed in delivering the content 122 to the user 130. Accordingly, the CDN server 140 disseminates the computed operational parameters 166 to devices 130 adapted to provide the specified file entities 122, which may include intervening servers such as origin servers 122, root servers 124 and content engines 126, as depicted at step 318.

If, at step 316, the delivery treatment is to be associated with the content entity itself for successive deliveries, then the content repository 170 stores the operational parameters 174 in the manifest 176 associated with the file (content) entry 174.

Those skilled in the art should readily appreciate that the programs and methods for selecting and providing delivery treatment for CDN content entities as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for selecting and providing delivery treatment for CDN content entities has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of providing content in a content delivery network (CDN) comprising:
   identifying a plurality of delivery treatments adaptable to content entities in the CDN, the delivery treatments operable to provide a particular delivery result to the content entity;
   enumerating user visible selection variables corresponding to each of the delivery treatments;
   displaying available content entities and selection variables to a user as a range of choices on a graphical user interface (GUI);
   receiving, from a user via the GUI, a selection of content entities and corresponding selection variables indicative of the preferred delivery treatment for each selected content entity, the selection variables defining a range of choices within available network resources;
   identifying delivery attributes from the received selection variables;
   mapping, in a set of rules, the identified delivery attributes to the corresponding delivery treatment for providing the particular delivery result;
   computing operational parameters corresponding to the mapped delivery treatment, the operational parameters adapted to provide the preferred delivery treatment by directing responsive nodes in the CDN;

selecting, based on the operational parameters, local servers to provide static portions of the content entities and source servers to provide dynamic portions of the content entities; and disseminating the computed operational parameters to selected servers adapted to provide the file entities of the content entity.

2. The method of claim 1, further comprising:

processing the identified delivery attributes according to a set of delivery rules, the delivery rules indicative of the operational parameters for providing the preferred delivery treatment.

3. The method of claim 2, further comprising:

matching the selection variables to the attributes corresponding to each of the available delivery treatments; and applying the operational parameters to perform delivery according to the matched delivery treatment.

4. The method of claim 3, wherein the content entities are stored digital data entries in a content distribution network operable to be transported from origin servers to edge nodes operable for serving users via an interconnection of server nodes in the content distribution network, the stored digital data entries further comprising at least one of individual files, groupings of files, and streaming media.

5. A data communications server device for distributing content comprising:
- a processor;
- a memory responsive to the processor;
- a content delivery application in the memory;
- an interface operable for communication with other data communication server devices and responsive to the content delivery application;
- a correlator responsive to the content delivery application and operable to:
  - identify a content entity operable for selective distribution patterns;
  - identify a plurality of user selectable preferred delivery treatments, the correlator further operable to receive at least one user selection variable indicative of a preferred treatment for delivery of the identified content entity, each of the user selection variables defining a range of choices within available network resources; and;
  - determine the corresponding operational parameters adapted to effect delivery of the identified content entries;
- select, based on the operational parameters, local servers to provide static portions of the identified content entity and source servers to provide dynamic portions of the identified content entity; and
- a delivery engine operable to map the received user selections to operational parameter the content delivery application operable to employ the interface to effect delivery of the content entity according to the mapped operational parameters to disseminate the mapped operational parameters to selected servers adapted to provide the file entities of the identified content entity the interface being coupled to a GUI such that receiving selections further comprises reading user input from GUI selections indicative of delivery treatment in a CDN, the delivery treatment denoted by selection buttons operable via the GUI, the selection buttons corresponding to a range of choices of the manner in which the file entities are processed in the CDN.

6. The data communications server device of claim 5 further comprising a set of delivery rules, wherein the correlator is further operable to:
- identify delivery attributes in the received selection variables; and
- process the identified delivery attributes according to the set of delivery rules, the delivery rules indicative of operational parameters for providing the preferred delivery treatment, wherein the delivery engine is further operable to compute the operational parameters corresponding to the identified delivery attributes for providing the delivery treatment.

7. The data communications server device of claim 6 wherein the CDN server is further operable to determine the set of delivery rules are operable to map a plurality of user selection variables to the corresponding operational parameters, each of the rules associating delivery attributes determined by the user selection variables to a preferred delivery treatment.

8. The data communications server device of claim 7 wherein the correlator is further operable to process the received user selections according to the set of delivery rules by matching the received selections to the attributes corresponding to each of the available delivery treatments, and the delivery engine is operable to applying the operational parameters to perform delivery according to the matched delivery treatment.

9. The data communications server device of claim 8 wherein the delivery engine is operable to disseminate the computed operational parameters to devices adapted to provide the specified file entities.

10. The data communications server device of claim 5 wherein the content entities are stored digital data items in a content distribution network operable to be transported from origin servers to edge nodes operable for serving users via an interconnection of server nodes in the content distribution network, the stored digital data items further comprising at least one of individual files, groupings of files, and streaming media.

11. A data communications server device for distributing content comprising:
- means for identifying a content entity operable for selective distribution patterns;
- means for displaying and receiving at least one user selection variable indicative of a preferred treatment for delivery of the identified content entity, the user selection variables defining a range of choices within available network resources, the user selection variable under the control of the user and presented as a range of choices on a graphical user interface (GUI), the means for receiving user selection variables further comprising:
- means for displaying available content entities and selection variables to a user; and
- means for receiving, from a user, a selection of content entities and corresponding selection variables indicative of the preferred delivery treatment for each selected content entity;
- means for mapping the received user selections to operational parameters according to a set of delivery rules, the delivery rules specifying delivery attributes corresponding to the user-controlled user selection variables;
- means for identifying delivery attributes from the received selection variables;
- means for effecting delivery of the content entity according to the mapped operational parameters to display delivery results according to the preferred delivery treatment; and selecting, based on the operational parameters, local servers to provide static portions of the content entity and source servers to provide dynamic portions of the content entity; and a delivery engine operable to map the received user selections to operational parameters, the user selection variables independent of the user selection variables of other users, the content delivery application operable to employ the interface to disseminate the computed operational parameters to selected servers adapted to provide the file entities of the identified content entity and to effect delivery of the content entity according to the mapped operational parameters to display delivery results according to the preferred delivery treatment, the interface being coupled to a GUI such that receiving selections further comprises reading user input from GUI selections indicative of delivery treatment in a CDN, the delivery treatment denoted by selection buttons operable via the GUI, the selection buttons corresponding to a range of choices of the manner in which the file entities are processed in the CDN.

12. The data communications server device of claim 11, further comprising:

means for processing identified delivery attributes according to the set of delivery rules, the delivery rules indicative of the operational parameters for providing the preferred delivery treatment.

13. The data communications server device of claim 12, wherein the means for processing identified delivery attributes according to the set of delivery rules further comprise:

means for matching the user selection variable to the attributes corresponding to each of the available delivery treatments; and means for applying the operational parameters to perform delivery according to the matched delivery treatment.

14. The data communications server device of claim 13, wherein the content entities are stored digital data entries in a content distribution network operable to be transported from origin servers to edge nodes operable for serving users via an interconnection of server nodes in the content distribution network, the stored digital data entries further comprising at least one of individual files, groupings of files, and streaming media.

15. The computer readable volatile or non-volatile storage medium comprising one or more sequences of instructions, which when executed by one or more processors, cause the one or more processors to perform a method of providing content in a content delivery network (CDN), the method comprising:

identifying a plurality of delivery treatments adaptable to content entities in the CDN, the delivery treatments operable to provide a particular delivery result to the content entity;

enumerating user visible selection variables corresponding to each of the delivery treatments;

displaying available content entities and selection variables to a user as a range of choices on a graphical user interface (GUI);

receiving, from a user via the GUI, a selection of content entities and corresponding selection variables indicative of the preferred delivery treatment for each selected content entity, the selection variables defining a range of choices within available network resources;

identifying delivery attributes from the received selection variables;

mapping, in a set of rules, the identified delivery attributes to the corresponding delivery treatment for providing the particular delivery result;

computing operational parameters corresponding to the mapped delivery treatment, the operational parameters adapted to provide the preferred delivery treatment by directing responsive nodes in the CDN;

selecting, based on the operational parameters, local servers to provide static portions of the content entities and source servers to provide dynamic portions of the content entities; and disseminating the computed operational parameters to selected servers adapted to provide the file entities of the content entity.

16. The computer-readable storage medium of claim 15, further comprising instructions, which when executed by the one or more processors, perform:

processing the identified delivery attributes according to a set of delivery rules, the delivery rules indicative of the operational parameters for providing the preferred delivery treatment.

17. The computer-readable storage medium of claim 16, further comprising instructions, which when executed by the one or more processors, perform:

matching the selection variables to the attributes corresponding to each of the available delivery treatments; and applying the operational parameters to perform delivery according to the matched delivery treatment.

18. The computer-readable storage medium of claim 17, wherein the content entities are stored digital data entries in a content distribution network operable to be transported from origin servers to edge nodes operable for serving users via an interconnection of server nodes in the content distribution network, the stored digital data entries further comprising at least one of individual files, groupings of files, and streaming media.

* * * * *